April 5, 1927.

J. KAHN 1,623,249

ELECTRIC WELDING MACHINE

Filed Sept. 10 1925     2 Sheets-Sheet 1

INVENTOR
Julius Kahn
BY
Edward N. Pagelsen
ATTORNEY

April 5, 1927. 1,623,249
J. KAHN
ELECTRIC WELDING MACHINE
Filed Sept. 10 1925   2 Sheets-Sheet 2
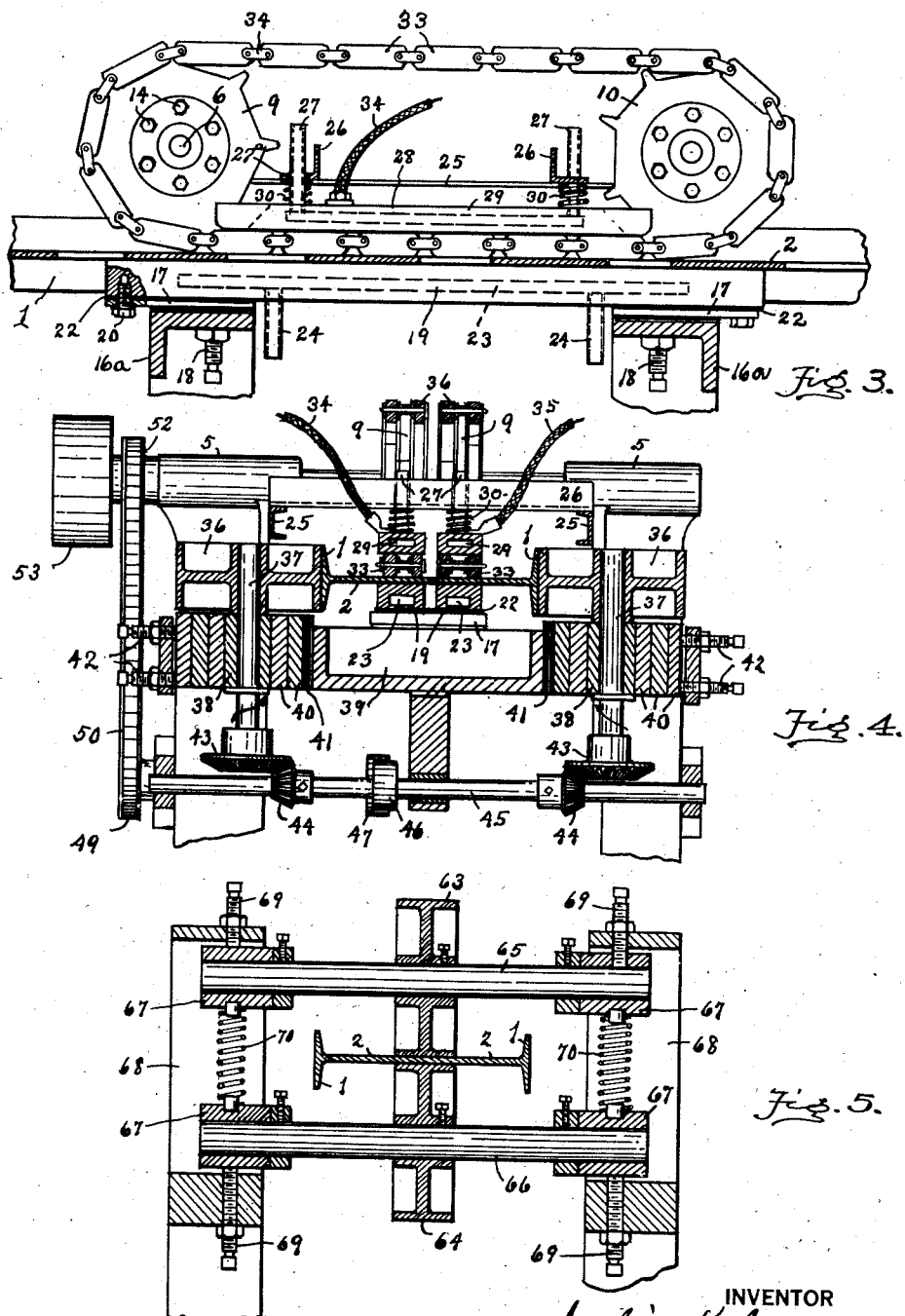

Patented Apr. 5, 1927.

1,623,249

UNITED STATES PATENT OFFICE.

JULIUS KAHN, OF YOUNGSTOWN, OHIO.

ELECTRIC-WELDING MACHINE.

Continuation of application Serial No. 683,707, filed December 31, 1923. This application filed September 10, 1925. Serial No. 55,466.

This application is a continuation of my application Serial Number 683,707, filed December 31, 1923, which is hereby abandoned.

This invention relates to electric buttwelding machines, and particularly to machines of this character provided with means for connecting the sections of rolled beams by welding together the projecting tongues formed by shearing the webs of such beams along zig-zag lines so as to produce structural members of much greater height but with the same tension and compression chords as the original beams, and its object is to provide a machine of this character which will be continuous and automatic in its operation, which will have great capacity, and which shall be simple, reliable and comparatively inexpensive to build.

This invention consists of a welding device and means to feed thereto two sections of a rolled beam which has been sheared along a zig-zag line to form tongues, said feeding means causing the tongues of the two sections to engage, said welding device being adapted to bring the tongues up to the welding temperature and press them together.

It further consists of guides or shoes and endless chains to pass along between the guides or shoes with the two sections of the beam, said chains serving as electrodes to conduct current to the sections of the beam.

It further consists of means for forcing together the ends of such tongues on the beam sections as they are being welded and to flatten the joints after the tongues have been welded.

It also consists in the details of construction illustrated in the accompanying drawings and particularly pointed out in the claims.

Figure 1:
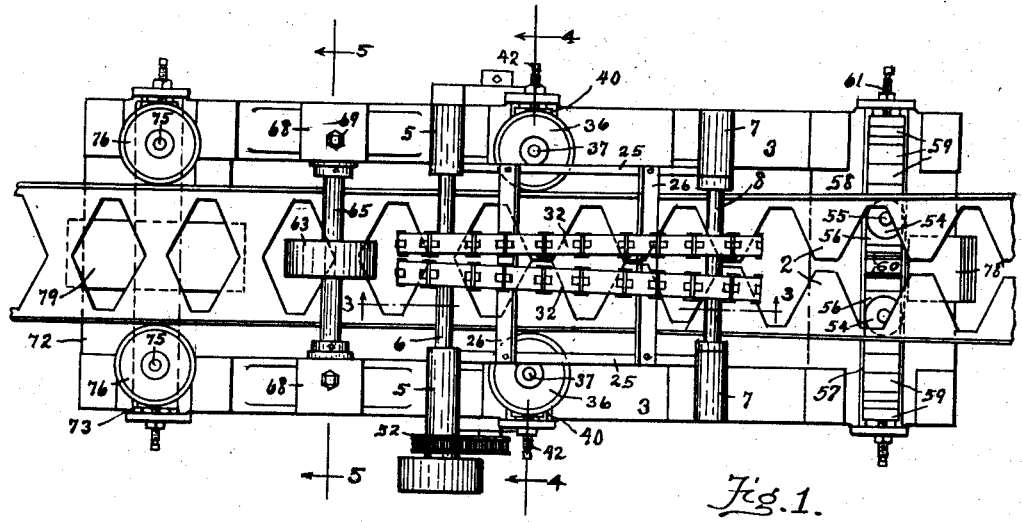
Figure 2:
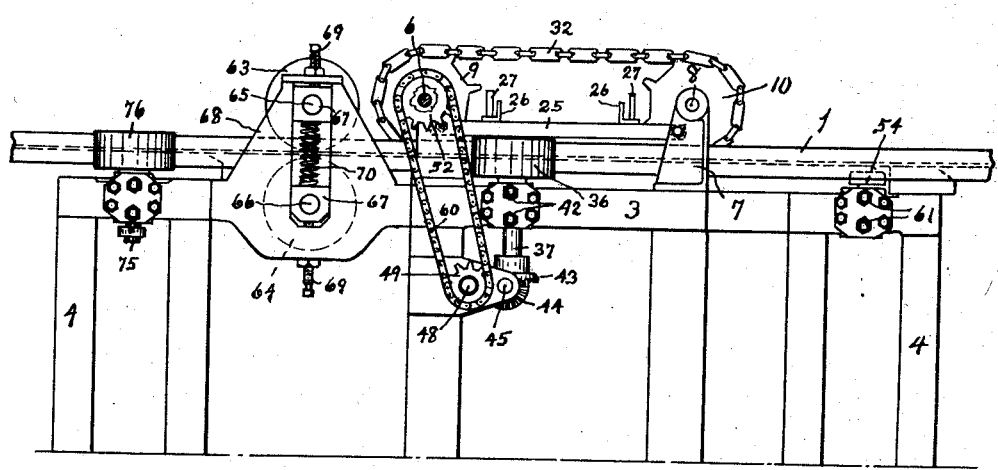
Figure 6:
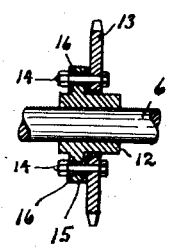

In the drawings, Fig. 1 is a plan and Fig. 2 is a side elevation of this improved welding machine. Figs. 3, 4 and 5 are sections on the lines 3—3, 4—4 and 5—5 of Fig 1, respectively. Fig. 6 is a central section of a sprocket wheel.

Similar reference characters refer to like parts throughout the several views.

Structural beams, such as I-beams and channels, are rolled to any desired height, but the minimum thicknesses of the webs and flanges are limited by metallurgical and mechanical conditions. The result is that for many purposes these beams are not properly proportioned for the loads they are to carry. This is particularly true of the webs of the beams which are often much too heavy to conform to the best engineering specifications.

It has been suggested that the webs of rolled I-beams and channels be sheared along zig-zag lines to form sections, each having tongues of the same height, all the tongues being evenly spaced, and to then unite the ends of these tongues to produce a beam of much greater height than the original beam, the new beam having the same upper and lower chords but having a web of openwork with sufficient shearing and compression strength for the desired purpose. As the load-bearing capacity of beams varies substantially with the square of their heights, such reconstructed beams have much greater load bearing capacity than the original beams.

Two beam sections to be united are shown in plan in Fig. 1 and consist of the flanges 1 and the tongues 2 which were originally portions of the same web. These sections are fed into the machine in such a manner that the ends of these tongues 2 gradually approach and meet. When they contact, an electric current quickly heats the contacting ends of the tongues to a welding temperature, and the tongues are then pressed together to effect a weld and thereafter the "flash" at the joints is rolled down, as will be described later on, although this last operation may be omitted if desired. This machine is continuous in operation and the beam sections are fed into the machine in any desired manner.

The machine is built up of two side frames, each comprising side bar 3 and any desired number of legs 4. On these side bars are mounted the bearings 5 for the head shaft 6 of the conductor chains and the bearings 7 for the tail shaft 8. On these shafts are mounted the pairs of head sprocket wheels 9 and tail sprocket wheels 10. These wheels are preferably constructed, as shown in Fig. 6, to comprise a hub 12 and a disk 13 attached to the hub flange 15 by bolts 14 and insulated therefrom by the thimbles 16 of any desired insulating material.

Extending across between the side bars 3, preferably just below the shafts 6 and 8, are cross bars 16ª supporting plates 17 which are vertically adjustable by means of the screws 18. Shoes 19, preferably of copper, are secured to these plates by means of the insulated screws 20, but the shoes are insulated from the plates by the sheets 22 of insulating material. These shoes are preferably hollow, cooling water being conducted to and from the chambers 23 therein by pipes 24.

Extending between the bearings 5 and 7 are bars 25 which support the transverse angle bars 26. The tubes 27 are slidable in holes in these angle bars but insulated therefrom by thimbles 27ª and connect to the upper shoes 28, also preferably of copper and formed with chambers 29 to and from which these tubes may conduct the necessary cooling water. The shoes 28 are pressed down by the springs 30.

Extending around the sprocket wheels 9 and 10 and between the shoes 19 and 28 are the two conductor chains 32, each formed of conductor blocks 33 and connecting links 34. These blocks 33 are pressed down against the tongues 2 of the beams by the upper shoes 28 and the springs 30 and as the current passes to and from the shoes 28 over the conductors 34 and 35, it flows through the blocks 33 to these tongues and passes between the ends of the tongues as they approach each other sufficiently, heating their ends to welding temperature. Any desired means may be used to regulate the current but as such mechanism forms no part of this invention, none is shown.

The hot ends of the tongues are pressed together by means of the power-driven closing rolls 36 mounted on the vertical shafts 37, rotatable in the bearings 38. These bearings are preferably positioned in pockets in the cross bar 39 by the spacing blocks 40 and 41 and the set screws 42 to adjust this machine for beams of various heights.

Bevel gears 43 are shown on the lower ends of these shafts meshing with the adjustable pinions 44 on the transverse shaft 45. A pinion 46 on this shaft 45 meshes with a gear 47 on the countershaft 48 on whose outer end is a sprocket wheel 49. A driving chain 50 connects this sprocket wheel with a second sprocket wheel 52 on the head shaft 6. Any one of these three shafts may receive power from a motor, a pulley 53 on the shaft 6 being shown to indicate that as the main shaft of the machine. The beam sections are fed through the machine by these conductor chains and the closing rolls 36, the other rolls serving as guides and being turned by the work.

The tongues of the two sections of the beam are prevented from contacting before they come between the shoes by the small rolls 54 which preferably engage the inner sides of the lower flanges of the beam sections. These rolls are mounted on pins 55 carried by blocks 56 which are positioned in a channel 57 in the end cross-member 58 of the frame, between the spacing blocks 59 and 60. These blocks may be secured in position by the set screws 61. It will be noticed in Fig. 1 that the tail sprocket wheels 10 are spaced farther apart than the wheels 9. This is to prevent sliding movement between the blocks 33 and the tongues 2 of the beam sections as the sections converge in feeding forward.

In order to flatten the flash of the welds at the ends of the tongues 2, a pair of rolls 63 and 64 are provided, mounted on shafts 65 and 66 which are freely rotatable in the bearings 67 vertically slidable in the pedestals 68 on the frame. These bearings are normally held apart against the adjusting screws 69 by the springs 70 and these rolls are therefore adjustable to webs of different thicknesses.

At the rear end of the machine is another cross bar 72 having a channel 73 to receive the blocks which carry the shafts 75 on which the guide rolls 76 are mounted. These rolls together with the rolls 36 maintain the beam in a straight line as it emerges from the machine. The sections of the beam as they enter the machine are supported by the table 78 and the finished beam as it leaves the machine by the table 79.

When the tongues of the two sections touch, the metal begins to burn away before the welding begins and the loss is sometimes as much as twice the thickness of the material being welded. As the flow of current is from one shoe 29 through the chain below it, across between the tongues 2, through the other chain to the other shoe 29, it is obvious that any other desired means may be employed to guide the sections of the beams being formed and that the chains 32 may be entirely omitted. I prefer to use the chains, however, as they have demonstrated their efficiency for the present purpose. The other details of construction and the proportions of the parts of this machine may all be changed by those skilled in the art without departing from the spirit of my invention as set forth in the following claims.

I claim:—

1. In an electric welding machine, parallel guides between which the work is slidable, and a conductor chain adapted to pass between the guides with the work.

2. In an electric welding machine, pairs of parallel guides between which the work is slidable, a conductor chain adapted to pass between each pair of guides with the work, and means to press together the pieces of work to be welded as they pass between the guides.

3. In an electric welding machine, parallel shoes between which the work is slidable, a conductor chain adapted to pass between the shoes with the work, means to press together the pieces of work to be welded as they pass between the shoes, and means to guide the work so as to prevent contact of the pieces to be welded before reaching the chains and shoes.

4. In an electric welding machine, parallel shoes between which the work is slidable, a conductor chain adapted to pass between the shoes with the work, means to press together the pieces of work to be welded as they pass between the shoes and means to roll down the flash of the welds after the work passes from the shoes.

5. In an electric welding machine, parallel shoes between which the work is slidable, a conductor chain adapted to pass between the shoes with the work, means to press together the pieces of work to be welded as they pass between the shoes, means to roll down the flash of the welds after the work passes from the shoes, and means to guide the work after it leaves said rolls.

6. In an electric welding machine, pairs of shoes between which the work is slidable, electric conductors connecting to one shoe of each pair, a shaft at each end of the sets of shoes sprocket wheels on the shafts, sprocket chains on said wheels and slidable between the shoes with the work to be welded, and a pair of rolls rotatable on axes parallel to the planes of the sprocket wheels and positioned between the shafts therefor to position the work between the shoes.

7. In an electric welding machine, pairs of shoes between which the work is slidable, electric conductors connecting to one shoe of each pair, a shaft at each end of the sets of shoes, sprocket wheels on the shafts, sprocket chains on said wheels and slidable between the shoes with the work to be welded, a pair of rolls rotatable on axes parallel to the planes of the sprocket wheels and positioned between the shafts therefor to position the work between the shoes, and means to drive the sprocket wheels and the rolls to feed the work through the machine.

8. In an electric welding machine, two pairs of parallel shoes between which the work is slidable, electric conductors connecting to one shoe of each pair, a shaft at each end of the sets of shoes, sprocket wheels on the shafts, sprocket chains on said wheels and slidable between the shoes with the work to be welded, a pair of rolls rotatable on axes parallel to the planes of the sprocket wheels and positioned between the shafts therefor to position the work between the shoes, means to drive the sprocket wheels and the rolls to feed the work through the machine, and means to flatten the welds after they leave the shoes.

9. In an electric welding machine, two pairs of parallel shoes between which the work is slidable electric conductors connecting to one shoe of each pair, a shaft at each end of the sets of shoes, sprocket wheels on the shafts, sprocket chains on said wheels and slidable between the shoes with the work to be welded, a pair of rolls rotatable on axes parallel to the planes of the sprocket wheels and positioned between the shafts therefor to position the work between the shoes, means to drive the sprocket wheels and the rolls to feed the work through the machine, and a pair of opposed rolls to engage the work to flatten the welds as they leave the shoes, said rolls being actuated by the work as it passes between them.

10. In an electric welding machine, two pairs of parallel shoes between which the work is slidable, electric conductors connecting to one shoe of each pair, a shaft at each end of the sets of shoes, sprocket wheels on the shafts, sprocket chains on said wheels and slidable between the shoes with the work to be welded, a pair of rolls rotatable on axes parallel to the planes of the sprocket wheels and positioned between the shafts therefor to position the work between the shoes, means to drive said chains and rolls, means to guide the work to the chains, and means to guide the work after it leaves the chains.

11. In an electric welding machine, two pairs of parallel shoes between which the work is slidable, electric conductors connecting to one shoe of each pair, a shaft at each end of the sets of shoes, sprocket wheels on the shafts, sprocket chains on said wheels and slidable between the shoes with the work to be welded, a pair of rolls rotatable on axes parallel to the planes of the sprocket wheels and positioned between the shafts therefor to position the work between the shoes, a pair of opposed rolls to engage the work to flatten the welds as they leave the shoes, a pair of rolls to guide the work out of the machine, and a pair of rolls to engage the work as it enters the machine to prevent the parts from engaging before they reach the shoes, said three last named pairs of rolls being actuated by the work.

12. In a machine for welding metal parts, stationary current carrying shoes to conduct current to the parts to be welded, and means for convergingly feeding parts to bring them into engagement while receiving current.

13. In an electric welding machine, two pairs of parallel current carrying shoes between which the work is slidable, a pair of chains mounted at an angle to each other for convergingly feeding parts to be welded to the spaces between the shoes, and means to drive the chains.

14. In an electric welding machine, means for longitudinally feeding metal bars to be welded to the machine in converging non-parallel relation, and stationary means for joining the parts in parallel relation.

15. In an electric welding machine, means for longitudinally feeding metal bars to be welded to the machine in converging non-parallel relation, and stationary means for butt welding the parts in parallel relation.

16. In an electric welding machine, two pairs of shoes and means to convergently feed parts in two paths to the spaces between the shoes and to bring the parts together while in said spaces, and means to conduct current to said parts when in said spaces.

JULIUS KAHN.